Patented Nov. 28, 1950

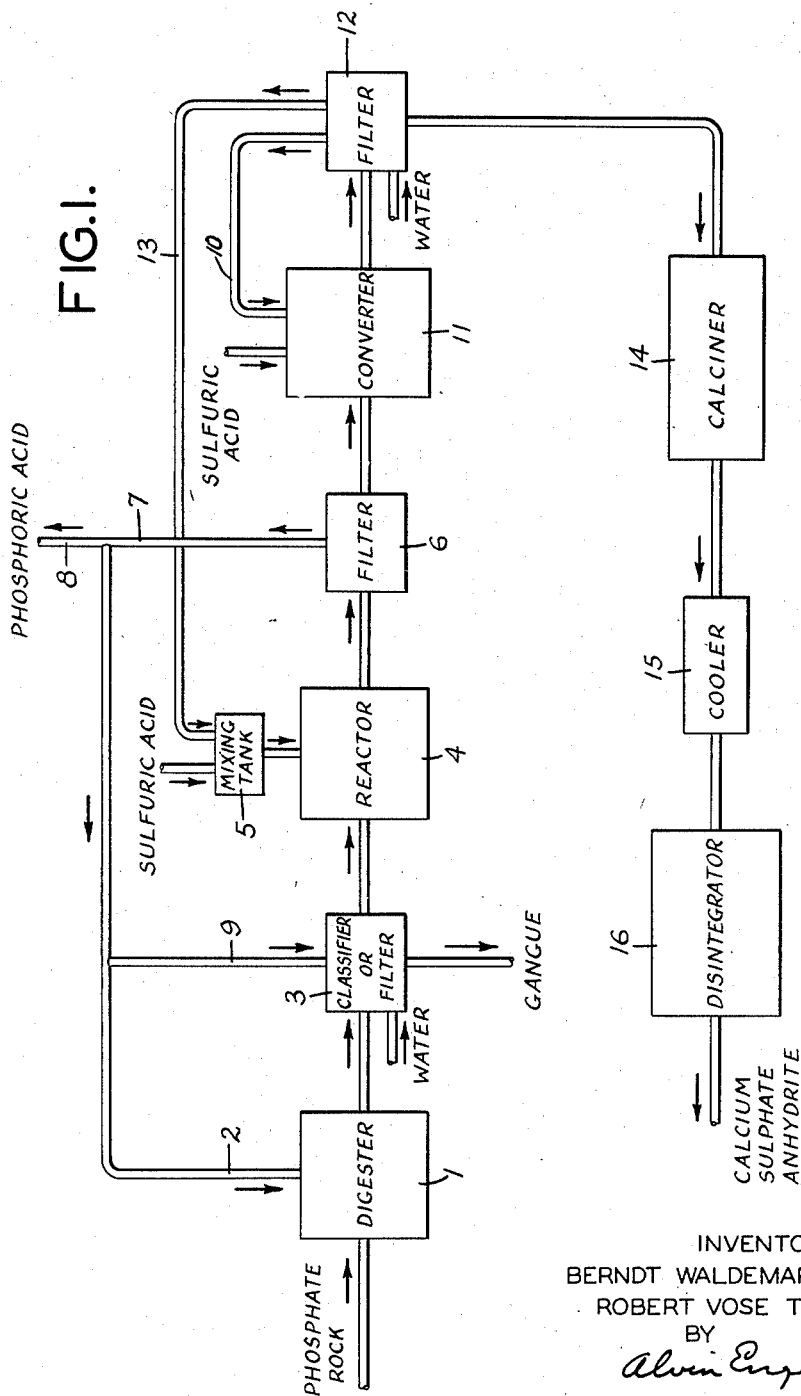

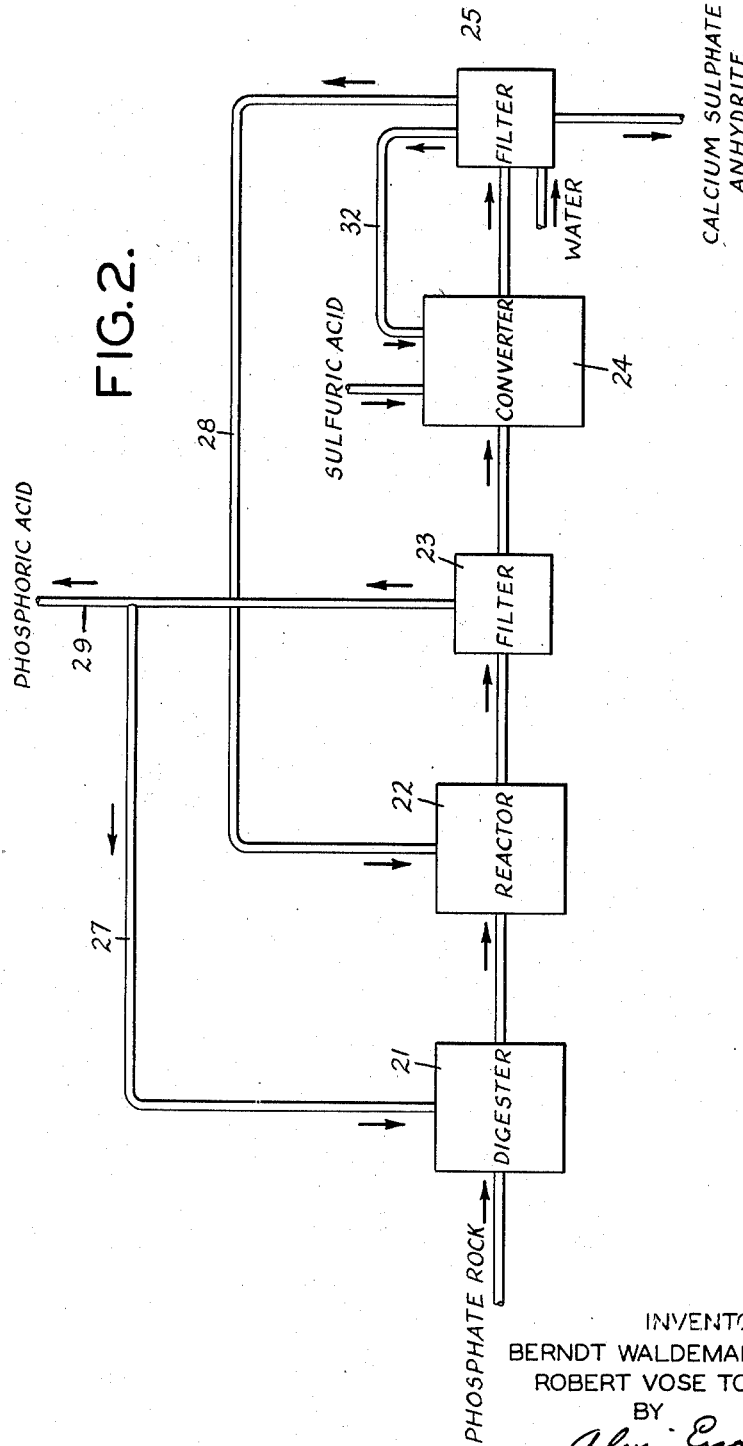

2,531,977

UNITED STATES PATENT OFFICE 2,531,977

PROCESS FOR MANUFACTURE OF PHOSPHORIC ACID

Berndt Waldemar Hammaren, Floral Park, N. Y., and Robert Vose Townend, Arlington, N. J., assignors to Allied Chemical & Dye Corporation, New York, N. Y., a corporation of New York Application January 22, 1948, Serial No. 3,784

12 Claims. (Cl. 23—165)

This invention relates to the production of phosphoric acid and more particularly refers to a new and improved process for converting phosphate rock into strong phosphoric acid with the concomitant production of an improved calcium sulfate.

In the conventional "wet" method of producing phosphoric acid, phosphate rock is digested with a mixture of phosphoric acid and sulfuric acid, causing a reaction between the calcium phosphate in the rock and the sulfuric acid to produce phosphoric acid and a precipitate of hydrated calcium sulfate. It is well known in the art that due to the settling or filtration difficulties with the calcium sulfate produced by digesting phosphate rock with sulfuric acid the strength of the phosphoric acid so produced is usually limited to about 35% $H_3PO_4$. Furthermore, to our knowledge, no prior process has produced strong phosphoric acid with the concomitant production of a high quality calcium sulfate anhydrite.

One object of the present invention is to provide a process for economically and efficiently producing increased yields of strong phosphoric acid. Strong phosphoric acid referred to herein is acid assaying over 35% $H_3PO_4$. Another object of this invention is the production of a purified calcium sulfate anhydrite. A further object of the invention is the more complete utilization of the reagents used in the process. Further objects and advantages will be apparent from the description and accompanying drawings.

The present invention comprises digesting phosphate rock in strong phosphoric acid to form monocalcium phosphate dissolved in excess phosphoric acid, separating the coarse gangue and other insoluble materials from the liquor, adding sulfuric acid to the liquor to generate phosphoric acid and to precipitate calcium sulfate hydrate, separating phosphoric acid solution from the calcium sulfate by filtration, treating the calcium sulfate precipitate with strong sulfuric acid to simultaneously convert insoluble phosphates into soluble phosphates and produce stable calcium sulfate anhydrite, and separating the calcium sulfate anhydrite. The sulfuric acid which was used for treating the calcium sulfate, after separation and containing recovered soluble phosphates, is utilized in the process for converting the monocalcium phosphate to phosphoric acid and precipitating calcium sulfate. Likewise a portion of the phosphoric acid produced in the process is recirculated for the purpose of digesting and converting the phosphate rock to monocalcium phosphate.

As an alternative method of operation, the digestion products resulting from the reaction of phosphate rock with strong phosphoric acid may be treated with sulfuric acid to produce phosphoric acid and calcium sulfate without first separating the gangue.

We have found that calcium sulfate precipitates produced in conventional practice contain phosphates in an insoluble form, resulting in a loss up to 10% or more phosphoric acid. We are unable to account for the non-digestion of such phosphates when treated with sulfuric acid in the initial stages of the process. We have made the surprising discovery that sulfuric acid of the proper concentration when added to the calcium sulfate precipitate maintained at the desired temperature performs at least two functions; (a) converting the insoluble phosphate in the precipitate to soluble phosphates which can be readily recovered in the process, thereby enhancing the yields of phosphoric acid, and (b) transforming the calcium sulfate hydrate into stable calcium sulfate anhydrite which is easily filtered from the solution without blinding the cloth. The treatment of hydrated calcium sulfate produced in the process with sulfuric acid has the further advantages of purifying the calcium sulfate and of eliminating the requirement of further treatment of the hydrate to convert it into the anhydrite.

The sulfuric acid consumed in treating calcium sulfate hydrate precipitate is small in amount and for maximum economy and efficiency the mixture of unreacted sulfuric acid and soluble phosphates resulting from such treatment are returned to the reactor for further conversion of the monocalcium phosphate into phosphoric acid. In this manner there is accomplished not only a complete utilization of the sulfuric acid but also the avoidance of a waste acid disposal problem. By returning the soluble phosphates to the reactor in the system, these phosphates are recovered as strong phosphoric acid without the necessity of employing a separate expensive apparatus for their recovery.

Another feature of the present invention involves separation of the monocalcium phosphate solution resulting from the digestion of phosphate rock with strong phosphoric acid to remove gangue and other insoluble material, thereby eliminating these impurities from the calcium sulfate subsequently precipitated in the process by the action of sulfuric acid. This makes unnecessary the wet classification of the calcium sulfate slurries to remove these materials, or if classification of the dry ground calcium sulfate is practiced, greatly lessens the classification load on the milling system, thereby markedly reducing the cost of processing calcium sulfate as well as effecting an improved product.

Removal of the gangue and other insoluble material from the monocalcium phosphate solution prior to reaction with sulfuric acid also avoids carrying over such materials into the phosphoric acid and results in a purer phosphoric acid product.

Fig. 1 is a diagrammatic flow sheet illustrating one method of practicing the invention.

Fig. 2 is a diagrammatic flow sheet illustrating another method of carrying out the present invention.

Referring to Fig. 1, phosphate rock is introduced into digester 1, wherein the rock is dissolved in an excess of strong phosphoric acid to produce a monocalcium phosphate solution. The phosphate rock prior to introduction into the system is first ground to a requisite degree of fineness, preferably so that all material passes a 20 mesh screen.

Phosphate rock, after grinding, may be used as a charging material to the process without any preliminary treatment. However, we have found that improved results were obtained by feeding the rock into a rotary calciner and heating it in direct contact with hot combustion gases at a temperature of about 1400° F. for the purpose of destroying the organic compounds. In this manner some of the impurities naturally present in phosphate rock are removed or reduced in amount, thereby resulting in a more highly purified phosphoric acid and calcium sulfate produced from the process. The calcined rock may then be ground to the desired degree of fineness.

Strong phosphoric acid previously produced in the process is introduced into the digester through conduit 2, in an amount in excess of that required to convert the phosphate rock to monocalcium phosphate and to impart sufficient fluidity to the reaction mixture to effectuate ready separation of the gangue from the liquor. Preferably, 8 to 14 parts by weight of phosphoric acid solution are added to 1 part by weight of phosphate rock. Generally, it will be found desirable to recirculate a greater quantity of phosphoric acid for digestion of the phosphate rock when producing a more concentrated acid as an end product; for example, when operating the process for 50% $H_3PO_4$, the ratio by weight of recirculated phosphoric acid to phosphate rock of about 10:1 will give good results; for 55% $H_3PO_4$, a ratio of 11:1; for 60% $H_3PO_4$, a ratio of 12:1; and for 65% $H_3PO_4$, a ratio of 14:1. If the process is carried out without the step of filtering the gangue as illustrated in Fig. 2, an even lower ratio of phosphoric acid to phosphate rock may be employed. Moderate temperatures of the order to 70° to 80° C., preferably 75° C., and the short time of less than two hours, preferably approximately one hour, will cause dissolution of the phosphate rock to monocalcium phosphate.

Although one digester is shown in the drawing, two digesters connected in series are preferred. These digesters may be of conventional design.

The effluent of digester 1 is then passed to classifier or filter 3 for more or less complete separation of gangue and insoluble material particularly of coarse solids from the monocalcium phosphate liquor. Any suitable separating device may be used for this purpose. The separated gangue is water-washed to remove soluble phosphates adhering thereto, and the water-washings are combined with the separated monocalcium phosphate liquor and the mixture introduced into reactor 4.

A solution of sulfuric acid and phosphoric acid obtained from the treatment of the hydrated calcium sulfate in the process is directed through line 13 into mixing tank 5 and to the latter from an external source is added, as required, sulfuric acid, which may be 93% commercial acid. Mixing tank 5 serves as a vessel for commingling the solution of sulfuric and phosphoric acids with added sulfuric acid to maintain therein the desired amount and concentration of sulfuric acid and also as a surge tank from which regulated amounts of acid are fed from mixing tank 5 into reactor 4. Good conversion of mono calcium phosphate to phosphoric acid is obtained with sulfuric acid varying in concentration from 25 to 35%, preferably about 30%. The phosphoric acid in mixing tank 5 acts as a diluent and facilitates the separation of calcium sulfate from the liquor. Sulfuric acid in slight excess of the amount theoretically required to convert all the monocalcium phosphate of phosphoric acid is added to reactor 4, thereby avoiding wasting acid and obtaining a phosphoric acid requiring a minimum of purification to remove surplus sulfuric acid. We have found satisfactory results were obtained when the free sulfuric acid content in the phosphoric acid product was between 0.15% and 1.0%.

Sulfuric acid reacts with the monocalcium phosphate in reactor 4 to produce phosphoric acid and a precipitate consisting of hydrated calcium sulfate at relatively mild conditions, ranging from temperatures of approximately 50° to 85° C., preferably 60° C. for 50% and 55% $H_3PO_4$ and 75° C. for 60% and 65% acid, and a time of about one-half to two hours, preferably one hour. The reactor may be of conventional design and preferably two reactors in series are employed.

The phosphoric acid solution and precipitated calcium sulfate then pass from reactor 4 into filter 6 for separation of the solid calcium sulfate from the phosphoric acid. One important advantage of this process is that good separation between solid and liquid need not be obtained. As previously explained, it is difficult to sharply separate the solid hydrated calcium sulfate from the liquor. Since in this process it is not necessary to obtain a dry solid from the liquor, the hydrated calcium sulfate may be removed in a wet form containing substantial amounts of phosphoric acid. This latter phosphoric acid is recirculated in the process in admixture with sulfuric acid for which it serves as a diluent and subsequently recovered.

Separated phosphoric acid is withdrawn from filter 6 through conduit 7 and a portion of it released from the system through line 8 as a product of the process. The remaining phosphoric acid is recirculated, the major portion returning to digester 1 through lines 7 and 2 to convert the phosphate rock into monocalcium phosphate, and the smaller amount introduced through line 9 into filter 3 as an additional means of washing the gangue free from soluble phosphates and unreacted calcium phosphate.

Calcium sulfate hydrate and phosphoric acid usually in the form of a very thick slurry then flows from filter 6 into converter 11 into which is introduced an excess of strong sulfuric acid which simultaneously converts the insoluble phosphates contained in the slurry to soluble phosphoric acid and dehydrates the calcium sulfate hydrate to calcium sulfate anhydrite. Factors influencing the conversion are concentration of sulfuric acid, amount and concentration of phosphoric acid, temperature, time and presence of impurities. The concentration of sulfuric acid and the temperature were found to be of prime importance; the other factors having a relatively small effect. Conditions for obtaining a stable calcium sulfate anhydrite may be best illustrated by the following tabulation:

| Temperature, °C. | Time, hours | Per Cent, $H_3PO_4$ | Per Cent, $H_2SO_4$ | Calcium Sulfate |
|---|---|---|---|---|
| 30-40 | 20 | 5-28 | 5-20 | Gypsum. |
| 60 | 2-3 | 5-28 | [1]33 | Anhydrite. |
| 75 | 2-3 | 5-28 | [1]28-30 | Do. |
| 90 | 2-3 | 5-28 | [1]20 | Do. |
| Boiling Point | 2-3 | 5-28 | [1]15 | Do. |

[1] These concentrations are approximately the minimum at the temperatures indicated for stable anhydrite formation.

For production of strong phosphoric acid of 35% or higher concentration, we prefer to treat the calcium sulfate hydrate with sulfuric acid solutions of at least 28% $H_2SO_4$ concentration.

Effluent from converter 11 is then introduced into filter 12 for the purpose of separating calcium sulfate anhydrite from the liquor. Very small amounts of sulfuric acid are consumed in converter 11, the primary effect being one of dilution by the water of hydration. The filtrate from filter 12, containing unreacted sulfuric acid and phosphoric acid is returned through line 13 to mixing tank 5 and thence into reactor 4 to effect conversion of monocalcium phosphate to phosphoric acid and precipitation of calcium sulfate. In this manner all of the sulfuric acid introduced into the process is usefully employed. If a classifier is used instead of filter 3 for handling the gangue, a clarifying filter should desirably be interposed in return line 13 to remove the solids in the liquid flowing therethrough.

A portion of the filtrate from filter 12 is returned through line 10 to converter 11 for the purpose of diluting the mixture and providing a fluid mix which will readily flow to filter 12 and be easily separated therein. Calcium sulfate anhydrite is washed with water to remove soluble materials therefrom and the water washings combined with the filtrate.

Insoluble calcium sulfate anhydrite when removed from filter 12 is in a moist state and should desirably be heated to a temperature of about 800° C. in calciner 14 within 2 to 3 hours after filtration. Calcined calcium sulfate anhydrite is then cooled in cooler 15 by simply blowing cold air through the hot calcined product and the cooled calcium sulfate disintegrated to break up agglomerates in disintegrator 16 and thence removed from the system for packaging and shipping.

Calcium sulfate anhydrite may be readily obtained in a particle size down to 2 to 3 microns by introducing calcium sulfate anhydrite seed in converter 11 of Fig. 1 or converter 24 of Fig. 2. Anhydrite seed, for example, may be conveniently prepared from the filter-cake solids from filter 6 or filter 23 by digesting them with two parts by weight strong sulfuric acid, preferably with acid having a concentration of 85% or higher sulfuric acid, at about 55° C. for one-half hour or longer. Amounts of seed between 2% and 10% of the weight of the hydrated calcium sulfate to be treated were found to be effective. When filtering off the gangue in accordance with the operation illustrated in Fig. 1, a remarkable white and brilliant anhydrite can be obtained which is especially suitable and desirable for use as a paper filler or pigment extender.

Fig. 2 represents an alternative simplified method of practicing the invention. Calcined phosphate rock together with recirculated phosphoric acid from line 27 are introduced into digester 21 for the purpose of converting the rock into monocalcium phosphate. The effluent from digester 21 without separation of the gangue, is directed into reactor 22, wherein it is mixed with sulfuric acid recovered from the process by way of line 28 and the monocalcium phosphate converted to phosphoric acid and a precipitate of calcium sulfate. If this supply of sulfuric acid is insufficient for conversion of the mono-calcium phosphate, supplemental acid from an external source may be introduced into reactor 22. The mixture of phosphoric acid and calcium sulfate is passed into filter 23 to separate the solids therefrom. The filtrate, consisting of strong phosphoric acid, is in small part removed from the system through line 29 as an end product, and the greater portion recirculated through line 27 to the digester for further digestion of phosphate rock. The precipitate from filter 23 is introduced into converter 24 and admixed therein with sulfuric acid, whereby the insoluble phosphates are acted upon by the acid to form soluble phosphates and the calcium sulfate hydrate is transformed to calcium sulfate anhydrite.

The reaction products of converter 24 are separated by filter 25 into a solid consisting primarily of calcium sulfate anhydrite and filtrate composed of a mixture of sulfuric acid and phosphoric acid. This latter mixture is returned through line 28 to reactor 22 to effect conversion of the monocalcium phosphate to phosphoric acid and calcium sulfate. If filter 25 does not remove the solids completely but is operated in such manner that a small amount of semi-colloidal matter is carried through, the solids in the filtrate may be removed by a clarifying filter interposed in line 28. A portion of the filtrate from filter 25 may be returned through conduit 32 to converter 24. Calcium sulfate anhydrite is washed with water to remove soluble compounds adhering thereto and the water washings combined with the filtrate. Gangue may be separated from the calcium sulfate anhydrite by any suitable classification procedure. Although not shown in the drawings, surge tanks may be interposed at various points in the systems illustrated in Figures 1 and 2 for the purpose of assuring more constant flow of the materials and greater continuity of operation.

In order to further illustrate the invention Table 1, under columns I, II, III, and IV tabulates examples of operating data when practicing the invention in accordance with the flow sheet shown in Fig. 1 to produce 50%, 55%, 60% and 65% phosphoric acid, respectively. Table 2, columns V and VI, records the data for operations in accordance with Fig. 2 when producing 50% and 60% phosphoric acid, respectively.

Table 1

| | I | II | III | IV |
|---|---|---|---|---|
| Calcined Phosphate Rock charged to digester_____pounds__ | 2,200 | 2,200 | 2,160 | 2,140 |
| P$_2$O$_5$ in calcined Phosphate Rock_____pounds__ | 748 | 746 | 746 | 746 |
| Phosphoric acid recirculated to digester_____pounds__ | 20,000 | 22,000 | 24,000 | 30,000 |
| Digester temperature_____°C__ | 75 | 75 | 75 | 75 |
| Digester time_____hours__ | 1 | 1 | 1 | ¾ |
| Effluent leaving digester and entering filter_____pounds__ | 22,200 | 24,200 | 26,160 | 32,140 |
| Phosphoric acid recirculated to filter_____pounds__ | 1,000 | 1,000 | 1,000 | 1,000 |
| Water for washing gangue_____do__ | 500 | 500 | 360 | 300 |
| Gangue removed from filter_____pounds__ | 800 | 800 | 720 | 800 |
| Composition of gangue: | | | | |
|   Solids_____do__ | 460 | 470 | 428 | 500 |
|   H$_2$O_____do__ | 340 | 330 | 292 | 300 |
|   CaSO$_4$_____do__ | 140 | 140 | 140 | 144 |
|   P$_2$O$_5$_____do__ | 20 | 16 | 16 | 16 |
| P$_2$O$_5$ loss in gangue_____percent__ | 2.7 | 2.1 | 2.1 | 2.1 |
| Filtrate (monocalcium phosphate solution) leaving filter and entering reactor__pounds__ | 22,900 | 24,900 | 26,800 | 32,640 |
| Sulfuric acid entering reactor __pounds__ | 300 | 218 | 546 | 638 |
| Concentration of sulfuric acid __per cent__ | 93.33 | 93.57 | 93.41 | 93.10 |
| Recirculated acid (H$_2$SO$_4$ and H$_3$PO$_4$) entering reactor __pounds__ | 4,800 | 5,700 | 4,320 | 4,260 |
| Reactor temperature_____°C__ | 60 | 60 | 75 | 75 |
| Reactor time_____hours__ | 2 | 2 | 2 | ¾ |
| Effluent leaving reactor and entering filter_____pounds__ | 28,000 | 30,818 | 31,666 | 37,538 |
| Phosphoric acid product leaving system_____pounds__ | 2,000 | 1,818 | 1,666 | 1,538 |
|   H$_2$O_____do__ | 890 | 700 | 560 | 460 |
|   P$_2$O$_5$_____do__ | 724 | 724 | 724 | 724 |
| Analysis of phosphoric acid product: | | | | |
|   H$_3$PO$_4$_____per cent__ | 50 | 55 | 60 | 65 |
|   H$_2$SO$_4$_____do__ | 0.5 | 0.55 | 0.6 | 0.65 |
| Slurry leaving filter and entering converter_____pounds__ | 5,000 | 6,000 | 5,000 | 5,000 |
| Solids in slurry_____do__ | 3,000 | 3,000 | | |
| Sulfuric acid entering converter __pounds__ | 1,600 | 1,700 | 1,400 | 1,340 |
| Concentration of sulfuric acid __per cent__ | 93.13 | 93.17 | 93.14 | 93.14 |
| Filtrate entering converter from subsequent filtration__pounds__ | 3,000 | 3,300 | 3,300 | 3,400 |
| Effluent leaving converter and entering filter_____pounds__ | 9,600 | 11,000 | 9,700 | 9,740 |
| Water for washing calcium sulfate anhydrite_____pounds__ | 1,400 | 1,300 | 1,260 | 1,260 |
| Precipitate removed from filter __pounds__ | 3,200 | 3,300 | 3,340 | 3,340 |
| Composition of precipitate: | | | | |
|   Solids_____do__ | 2,400 | 2,400 | 2,440 | 2,426 |
|   CaSO$_4$ in solids_____do__ | 2,300 | | 2,360 | 2,400 |
|   H$_2$O_____do__ | 800 | 900 | 900 | 936 |
|   P$_2$O$_5$_____do__ | 4 | 6 | 6 | 6 |
| P$_2$O$_5$ loss in calcium sulfate anhydrite_____per cent__ | 0.5 | 0.8 | 0.8 | 0.8 |
| Calcium sulfate anhydrite after calcination, cooling and disintegrating_____pounds__ | | 2,340 | | |
| Calcium sulfate content_____do__ | | 2,328 | | |

Table 2

| | V | VI |
|---|---|---|
| Calcined phosphate rock charged to digester _____pounds__ | 2,200 | 2,140 |
| P$_2$O$_5$ in calcined phosphate rock_____do__ | 730 | 730 |
| Phosphoric acid recirculated to digester__do__ | 16,000 | 22,000 |
| Digester temperature_____°C__ | 60 | 75 |
| Digester time_____hours__ | 1 | 1 |
| Effluent leaving digester and entering reactor _____pounds__ | 18,200 | 24,140 |
| Sulfuric acid entering reactor_____do__ | | 146 |
| Concentration of sulfuric acid _____per cent__ | | 93.15 |
| Recirculated acid (H$_2$SO$_4$ and H$_3$PO$_4$) entering reactor_____pounds__ | 6,600 | 5,780 |
| Reactor temperature_____°C__ | 60 | 75 |
| Reactor time_____hours__ | 2 | 2 |
| Effluent leaving reactor and entering filter _____pounds__ | 24,800 | 30,066 |
| Phosphoric acid product leaving system__do__ | 2,000 | 1,666 |
|   H$_2$O_____do__ | 890 | 560 |
|   P$_2$O$_5$_____do__ | 724 | 724 |
| Analysis of phosphoric acid product: | | |
|   H$_3$PO$_4$_____per cent__ | 50 | 60 |
|   H$_2$SO$_4$_____do__ | 0.5 | 0.6 |
| Slurry leaving filter and entering converter _____pounds__ | 6,800 | 6,400 |
| Solids in slurry_____do__ | 3,400 | |
| Sulfuric acid entering converter_____do__ | 1,900 | 1,800 |
| Concentration of sulfuric acid_____per cent__ | 93.15 | 93.22 |
| Filtrate entering converter from subsequent filtration_____pounds__ | 2,100 | 2,300 |
| Effluent leaving converter and entering filter _____do__ | 10,800 | 11,500 |
| Water for washing calcium sulfate anhydrite _____do__ | 1,900 | 1,580 |
| Precipitate removed from filter_____do__ | 4,000 | 4,000 |
| Composition of precipitate: | | |
|   Solids_____do__ | 2,860 | 2,848 |
|   CaSO$_4$ in solids_____do__ | 2,440 | 2,500 |
|   H$_2$O_____do__ | 1,140 | 1,152 |
|   P$_2$O$_5$_____do__ | 6 | 6 |
| P$_2$O$_5$ loss in calcium sulfate anhydrite _____per cent__ | 0.8 | 0.8 |

Although certain preferred embodiments of the invention have been disclosed for purposes of illustration, it will be evident that various changes and modifications may be made therein without departing from the scope and spirit of the invention which is not to be limited save as defined in the appended claims.

We claim:

1. In a process for converting a calcium salt of phosphoric acid into phosphoric acid and a precipitate of calcium sulfate by reaction with sulfuric acid, the improvement which comprises separating the mixture of phosphoric acid and precipitate of calcium sulfate into a phosphoric acid portion substantially free from precipitate and a residue in the form of a slurry containing calcium sulfate precipitate and a substantial amount of liquid phosphoric acid, subjecting said residue to the action of a sulfuric acid solution, maintaining the mixture of sulfuric acid solution and said residue for a sufficient length of time to convert the calcium sulfate precipitate to calcium sulfate anhydrite at temperatures within the range of the boiling point of the sulfuric acid solution to 60° C., the temperature of the mixture being so correlated with the concentration of sulfuric acid in the solution that at a temperature of the boiling point of the solution said solution contains at least 15% sulfuric acid with this minimum limit increasing to 33% for a mixture at 60° C., separating said anhydrite from the liquor, and returning said liquor to the calcium salt of phosphoric acid for further conversion into phosphoric acid and a precipitate of calcium sulfate.

2. In a process for converting a calcium salt of phosphoric acid into phosporic acid and a precipitate of calcium sulfate by reaction with sulfuric acid, the improvement which comprises separating the mixture of phosphoric acid and precipitate of calcium sulfate into a phosphoric acid portion substantially free from precipitate and a residue in the form of a slurry containing calcium sulfate precipitate and a substantial amount of liquid phosphoric acid, subjecting said residue to the action of a sulfuric acid solution, maintaining the mixture of sulfuric acid solution and said residue for a sufficient length of time to convert the calcium sulfate precipitate to calcium sulfate anhydrite at temperatures within the range of the boiling point of the sulfuric acid solution to 60° C., the temperature of the mixture being so correlated with the concentration of sulfuric acid in the solution that at a temperature of the boiling point of the solution said solution contains at least 15% sulfuric acid with this minimum limit increasing to 33% for a mixture at 60° C., introducing a small amount of calcium sulfate anhydrite seed into said mixture thereby promoting the formation of fine-particle calcium sulfate anhydrite, separating said anhydrite from the liquor, and returning said liquor to the calcium salt of phosphoric acid for further conversion into phosphoric acid and a precipitate of calcium sulfate.

3. A process for converting phosphatic material into phosphoric acid and calcium sulfate anhydrite which comprises digesting said phosphatic material with phosphoric acid, adding sulfuric acid to the reaction products resulting from said digestion in an amount sufficient to convert the said reaction products into phosphoric acid and a precipitate of calcium sulfate hydrate, separating the mixture of phosphoric acid and precipitate of calcium sulfate hydrate into a phosphoric acid portion substantially free from precipitate and a residue in the form of a slurry containing calcium sulfate hydrate and a substantial amount of liquid phosphoric acid, withdrawing a portion of said phosphoric acid substantially free from precipitate from the system, recirculating another portion of said phosphoric acid substantially free from precipitate to said phosphatic material, adding a sulfuric acid solution to said residue, maintaining the mixture of sulfuric acid and said residue for a sufficient length of time to convert the calcium sulfate hydrate to calcium sulfate anhydrite at temperatures within the range of the boiling point of the sulfuric acid solution to 60° C., the temperature of the mixture being so correlated with the concentration of sulfuric acid in the solution that at a temperature of the boiling point of the solution said solution contains at least 15% sulfuric acid with this minimum limit increasing to 33% for a mixture at 60° C., separating calcium sulfate anhydrite from the liquor and introducing said liquor into the reaction products for further conversion into phosphoric acid and a precipitate of calcium sulfate hydrate.

4. A process for converting phosphatic material into phosphoric acid and calcium sulfate anhydrite which comprises digesting said phosphatic material with phosphoric acid, adding sulfuric acid to the reaction products resulting from said digestion in an amount sufficient to convert said reaction products to phosphoric acid and a precipitate of calcium sulfate, separating the mixture of phosphoric acid and precipitate of calcium sulfate into phosphoric acid substantially free from precipitate constituting a major portion of the phosphoric acid in the mixture and a residue in the form of a slurry containing calcium sulfate precipitate and the remaining portion of liquid phosphoric acid constituting a substantial part of the residue, withdrawing a portion of said phosphoric acid substantially free from precipitate from the system, recirculating another portion of said phosphoric acid substantially free from precipitate to the phosphatic material, adding sulfuric acid to said residue to effect conversion of insoluble phosphates to soluble phosphates and to transform hydrated calcium sulfate into calcium sulfate anhydrite, introducing a small amount of calcium sulfate anhydrite seed into the mixture of sulfuric acid and residue thereby promoting the formation of fine-particle calcium sulfate anhydrite, separating calcium sulfate anhydrite from the liquor and introducing said liquor into said reacton products for further conversion into phosphoric acid and a precipitate of calcium sulfate.

5. A process for converting phosphate rock into strong phosphoric acid and fine-particle calcium sulfate anhydrite which comprises digesting said phosphate rock with phosphoric acid in an amount sufficient to convert the calcium phosphate in said rock into monocalcium phosphate dissolved in an excess of phosphoric acid, separating at least the coarse gangue from the monocalcium phosphate solution, admixing sulfuric acid with the monocalcium phosphate solution in an amount sufficient to effect conversion of the monocalcium phosphate solution into phosphoric acid and a hydrated calcium sulfate precipitate, separating the mixture of phosphoric acid and hydrated calcium sulfate precipitate into a phosphoric acid portion substantially free from precipitate and a residue in the form of a slurry containing hydrated calcium sulfate precipitate and a substantial amount of liquid phosphoric acid, withdrawing a minor portion of said phosphoric acid substantially free from precipitate from the system, recirculating a major portion of said phosphoric acid substantially free from precipitate to the phosphate rock for further conversion into monocalcium phosphate, adding sulfuric acid to said residue to effect conversion of insoluble phosphates to soluble phosphates and to transform the calcium sulfate into calcium sulfate anhydrite, introducing a small amount of calcium sulfate anhydrite seed into the mixture of sulfuric acid and said residue thereby promoting the formation of fine-particle calcium sulfate anhydrite, separating the calcium sulfate anhydrite from the liquor and returning the liquor to the monocalcium phosphate solution.

6. A process for converting phosphatic material into strong phosphoric acid and calcium sulfate anhydrite which comprises digesting said phosphatic material with phosphoric acid in an amount sufficient to convert the calcium phosphate in said phosphatic material into monocalcium phosphate dissolved in an excess of phosphoric acid, separating insoluble solids from the monocalcium phosphate solution, admixing sulfuric acid with the monocalcium phosphate solution in an amount sufficient to effect conversion of the monocalcium phosphate solution into phosphoric acid and a hydrated calcium sulfate precipitate, separating the mixture of phosphoric acid and hydrated calcium sulfate precipitate into a phosphoric acid portion substantially free from precipitate and a residue in the form of a slurry containing hydrated calcium sulfate precipitate and a substantial amount of liquid phosphoric acid, withdrawing a portion of said phosphoric acid substantially free from precipitate from the system, recirculating a portion of said phosphoric acid substantially free from precipitate for washing the separated insoluble solids, recirculating a portion of said phosphoric acid substantially free from precipitate to the phosphatic material for further conversion into monocalcium phosphate, adding a sulfuric acid solution to said residue, maintaining the mixture of sulfuric acid and said residue for a sufficient length of time to convert insoluble phosphates to soluble phosphates and to transform the calcium sulfate hydrate into calcium sulfate anhydrite at temperatures within the range of the boiling point of the sulfuric acid solution to 60° C., the temperature of the mixture being so correlated with the concentration of sulfuric acid in the solution that at a temperature of the boiling point of the solution said solution contains at least 15% sulfuric acid with this minimum limit increasing to 33% for a mixture at 60° C., separating the calcium sulfate anhydrite from the liquor, and returning the liquor to the monocalcium phosphate solution.

7. A process of making strong phosphoric acid and calcium sulfate anhydrite from phosphate rock and sulfuric acid which comprises calcining and grinding phosphate rock, digesting said rock with 8 to 14 parts by weight of strong phosphoric acid produced in the process for a sufficient length of time to convert the calcium phosphate in said rock to monocalcium phosphate, separating gangue from the monocalcium phosphate solution, washing the gangue with phosphoric acid produced in the process and with water, combining said washings with the monocalcium phosphate solution, adding sulfuric acid to the mixture of washings and monocalcium phosphate in an amount in slight excess of that theoretically required to convert the monocalcium phosphate into calcium sulfate hydrate precipitate, separating the mixture of phosphoric acid and hydrated calcium sulfate precipitate into a phosphoric acid portion substantially free from precipitate and a residue in the form of a slurry containing hydrated calcium sulfate precipitate and a substantial amount of liquid phosphoric acid, withdrawing a portion of said phosphoric acid substantially free from precipitate from the system, recirculating a major portion of the remaining phosphoric acid substantially free from precipitate for digestion of the phosphate rock, recirculating a minor portion of the remaining phosphoric acid substantially free from precipitate for washing the gangue, adding a sulfuric acid solution to a major portion of said residue, maintaining the mixture of sulfuric acid and said major portion of residue for a sufficient length of time to convert insoluble phosphates to soluble phosphates and to transform calcium sulfate precipitate into stable calcium sulfate anhydrite at temperatures within the range of the boiling point of the sulfuric acid solution to 60° C., the temperature of the mixture being so correlated with the concentration of sulfuric acid in the solution that at a temperature of the boiling point of the solution said solution contains at least 15% sulfuric acid with this minimum limit increasing to 33% for a mixture at 60° C., subjecting a minor portion of said residue to the action of strong sulfuric acid to produce thereby a calcium sulfate anhydrite seed, introducing said calcium sulfate anhydrite seed into the mixture of the major portion of said residue and sulfuric acid in an amount between 2% and 10% of the weight of the calcium sulfate of said residue thereby promoting the formation of a fine-particle calcium sulfate anhydrite, separating said calcium sulfate anhydrite from the liquor, water washing said calcium sulfate anhydrite, combining said washing with said liquor, returning a portion of said liquor to the mixture of sulfuric acid solution and major portion of residue, and introducing the remaining liquor into the monocalcium phosphate solution for further conversion into phosphoric acid and a calcium sulfate precipitate.

8. A process for production of phosphoric acid which comprises mixing sulfuric acid and a calcium salt of phosphoric acid thereby obtaining a mixture of phosphoric acid and a precipitate of calcium sulfate, separating the mixture of phosphoric acid and precipitate of calcium sulfate into a phosphoric acid portion substantially free from precipitate and a residue in the form of a slurry containing calcium sulfate precipitate and a substantial amount of liquid phosphoric acid, subjecting said residue to the action of sulfuric acid for a sufficient length of time to convert the calcium sulfate precipitate into stable calcium sulfate anhydrite at temperatures within the range of the boiling point of sulfuric acid solution to 60° C., the temperature of the mixture being so correlated with the concentration of sulfuric acid in the solution that at a temperature of the boiling point of the solution, said solution contains at least 15% sulfuric acid with this minimum limit increasing to 33% for a mixture at 60° C., separating the mixture of unconverted sulfuric acid and phosphoric acid from the stable calcium sulfate anhydrite, and returning the mixture of unconverted sulfuric acid and phosphoric acid separated from the stable calcium sulfate anhydrite to said calcium salt of phosphoric acid for further conversion into phosphoric acid and a precipitate of calcium sulfate.

9. In a process for converting a calcium salt of phosphoric acid into phosphoric acid and a precipitate of calcium sulfate hydrate containing insoluble phosphates by reaction with sulfuric acid, the improvement which comprises separating the mixture of phosphoric acid and precipitate of calcium sulfate hydrate into a phosphoric acid portion substantially free from precipitate and a residue in the form of a slurry containing calcium sulfate precipitate and a substantial amount of liquid phosphoric acid, subjecting said residue to the action of sulfuric acid for a sufficient length of time to convert insoluble phosphates in the precipitate to soluble phosphates and to transform the calcium sulfate precipitate into stable calcium sulfate anhydrite at temperatures within the range of the boiling point of sulfuric acid solution to 60° C., the temperature being so correlated with the concentration of sulfuric acid in the solution that at a temperature of the boiling point of the solution said solution contains at least 15% sulfuric acid with this minimum limit increasing to 33% for a mixture at 60° C., separating the mixture of unconverted sulfuric acid and soluble phosphates from the calcium sulfate anhydrite and returning the mixture of unconverted sulfuric acid and soluble phosphates separated from the calcium sulfate anhydrite to said calcium salt of phosphoric acid for further conversion into phosphoric acid and a precipitate of calcium sulfate hydrate.

10. A process for converting phosphatic material into phosphoric acid and calcium sulfate which comprises digesting said phosphatic material with phosphoric acid, adding sulfuric acid to the reaction products resulting from said digestion in an amount slightly in excess of that theoretically required to convert the phosphatic material to phosphoric acid and a precipitate of calcium sulfate, separating the mixture of phosphoric acid and precipitate of calcium sulfate into a major portion of phosphoric acid substantially free from precipitate of calcium sulfate and a residue in the form of a slurry containing calcium sulfate precipitate and the remaining portion of liquid phosphoric acid constituting a substantial part of the residue, withdrawing a portion of said phosphoric acid substantially free from precipitate from the system, recirculating another portion of said phosphoric acid substantially free from precipitate to said phosphatic material, subjecting the said residue to the action of sulfuric acid for a sufficient length of time to convert insoluble phosphates in the precipitate to soluble phosphates and to transform the calcium sulfate precipitate into calcium sulfate anhydrite at temperatures within the range of the boiling point of sulfuric acid solution to 60° C., the temperature being so correlated with the concentration of sulfuric acid in the solution that at a temperature of the boiling point of the solution, said solution contains at least 15% sulfuric acid with this minimum limit increasing to 33% for a mixture at 60° C., separating the calcium sulfate anhydrite from the liquor and introducing said liquor substantially free from calcium sulfate anhydrite into said reaction products for further conversion into phosphoric acid and a precipitate of calcium sulfate.

11. A process for converting phosphate rock into phosphoric acid and calcium sulfate anhydrite which comprises digesting said phosphate rock with sufficient phosphoric acid to convert the calcium phosphate in the phosphate rock into a solution of monocalcium phosphate, adding sulfuric acid to the reaction products resulting from said digestion in an amount sufficient to convert the monocalcium phosphate to phosphoric acid and a precipitate of calcium sulfate, separating the mixture of phosphoric acid and precipitate of calcium sulfate into phosphoric acid substantially free from precipitate and a residue in the form of a slurry containing calcium sulfate precipitate and a substantial amount of liquid phosphoric acid, withdrawing a portion of said phosphoric acid substantially free from precipitate from the system, recirculating another portion of said phosphoric acid substantially free from precipitate to the phosphate rock, subjecting said residue to the action of sulfuric acid for sufficient length of time to convert insoluble phosphates in the precipitate to soluble phosphates and to transform the calcium sulfate precipitate into stable calcium sulfate anhydrite at temperatures within the range of the boiling point of sulfuric acid solution to 60° C., the temperature of the mixture being so correlated with the concentration of sulfuric acid in the solution that at a temperature of the boiling point said solution contains at least 15% sulfuric acid with this minimum limit increasing to 33% for a mixture at 60° C., separating the calcium sulfate anhydrite from the liquor and introducing said liquor substantially free from calcium sulfate anhydrite into the monocalcium phosphate solution for further conversion into phosphoric acid and a precipitate of calcium sulfate.

12. A process for converting phosphate rock into phosphoric acid and calcium sulfate anhydrite which comprises digesting said phosphate rock with phosphoric acid in an amount sufficient to convert the calcium sulfate in said phosphate rock into monocalcium phosphate dissolved in an excess of phosphoric acid, separating gangue from the monocalcium phosphate solution, admixing sulfuric acid with the monocalcium phosphate solution in an amount sufficient to effect conversion of the monocalcium phosphate solution into phosphoric acid and a calcium sulfate precipitate, separating the mixture of phosphoric acid and calcium sulfate precipitate into phosphoric acid substantially free from calcium sulfate precipitate constituting a major portion of the phosphoric acid in the mixture and a residue in the form of a slurry containing calcium sulfate precipitate and the remaining portion of liquid phosphoric acid constituting a substantial part of the residue, withdrawing a minor portion of said phosphoric acid substantially free from precipitate from the system, recirculating a major portion of said phosphoric acid substantially free from precipitate to the phosphate rock for further conversion into monocalcium phosphate, subjecting said residue to the action of sulfuric acid for a sufficient length of time to convert insoluble phosphates in the precipitate to soluble phosphates and to transform the calcium sulfate precipitate into stable calcium sulfate anhydrite at temperatures within the range of the boiling point of sulfuric acid solution to 60° C., the temperature of the mixture being so correlated with the concentration of sulfuric acid in the solution that at a temperature of the boiling point of the solution, said solution contains 15% sulfuric acid with this minimum limit increasing to 33% for a mixture at 60° C., separating the treated calcium sulfate precipitate from the liquor, and returning the liquor to the monocalcium phosphate solution.

BERNDT WALDEMAR HAMMAREN.
ROBERT VOSE TOWNEND.

REFERENCES CITED

The following references are of record in the file of this patent:

UNITED STATES PATENTS

| Number | Name | Date |
|---|---|---|
| 1,776,595 | Nordengren | Sept. 23, 1930 |
| 2,002,547 | Nordengren | May 28, 1935 |
| 2,006,342 | Booge et al. | July 2, 1935 |
| 2,049,032 | Weber et al. | July 28, 1936 |
| 2,485,164 | Peirce | Oct. 18, 1949 |

FOREIGN PATENTS

| Number | Country | Date |
|---|---|---|
| 453,582 | Great Britain | Dec. 5, 1934 |
| 515,293 | Great Britain | Nov. 30, 1939 |